US007426495B1

(12) United States Patent
Corless

(10) Patent No.: US 7,426,495 B1
(45) Date of Patent: Sep. 16, 2008

(54) VIRTUAL PACKING LIST

(75) Inventor: Peter P. Corless, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/569,093

(22) Filed: May 10, 2000

(51) Int. Cl.
G06Q 99/00 (2006.01)
(52) U.S. Cl. .............................. 705/75; 705/51; 705/59; 705/64; 715/200; 707/104.1; 713/150; 726/26; 726/27; 726/30; 380/200
(58) Field of Classification Search .............. 705/50–79, 705/26; 713/150; 715/500.1; 707/104.1; 726/26–33; 380/200–203
See application file for complete search history.

(56) References Cited

U.S. PATENT DOCUMENTS

| 5,708,709 | A | * | 1/1998 | Rose ............................ 705/59 |
| 5,809,144 | A | * | 9/1998 | Sirbu et al. ..................... 380/25 |
| 5,892,900 | A | | 4/1999 | Ginter et al. ................. 395/186 |
| 5,910,987 | A | | 6/1999 | Ginter et al. .................... 380/24 |
| 5,915,019 | A | | 6/1999 | Ginter et al. ..................... 380/4 |
| 5,917,912 | A | | 6/1999 | Ginter et al. .................... 380/24 |
| 5,920,861 | A | | 7/1999 | Hall et al. ........................ 707/9 |
| 5,943,422 | A | | 8/1999 | Van Wie et al. ................. 380/9 |
| 5,949,876 | A | | 9/1999 | Ginter et al. ..................... 380/4 |
| 5,982,891 | A | | 11/1999 | Ginter et al. ..................... 380/4 |
| 6,055,543 | A | * | 4/2000 | Christensen et al. ...... 707/104.1 |
| 6,154,738 | A | * | 11/2000 | Call .............................. 707/4 |
| 6,226,618 | B1 | * | 5/2001 | Downs et al. ................... 705/1 |
| 6,877,134 | B1 | * | 4/2005 | Fuller et al. ............... 715/500.1 |
| 2007/0277031 | A1 | * | 11/2007 | Ginter et al. ................. 713/155 |

FOREIGN PATENT DOCUMENTS

EP 0817412 * 7/1998
EP 0935209 * 11/1999

OTHER PUBLICATIONS

Dialog File 610, Acession No. 00269628, "TradeCard, Bureau Veritas Announce Partnership; Quality Assurance Company to Provide Global Inspection and Testing Services to online trade Transaction Network", May 2, 2000, Business Wire.*

* cited by examiner

Primary Examiner—Jalatee Worjloh
(74) Attorney, Agent, or Firm—Stolowitz Ford Cowger LLP

(57) ABSTRACT

A virtual packing list for facilitating electronic commerce transactions made over the Internet. When a consumer places an order over the Internet for digital content deliverables, a unique virtual packing list is generated for that order. The virtual packing list contains a manifest of all the digital contents ordered by the consumer. The virtual packing list also optionally includes legal rights, files, and/or other documentation pertaining to the intellectual property corresponding to that commercial transaction. The order is filled based on the virtual packing list. Thereupon, the ordered digital contents, along with the virtual packing list, is downloaded to the consumer. The consumer can verify delivery of the digital contents based on the virtual packing list. Furthermore, the virtual packing list can be used in a host of post-order processes, such as accounting, return receipt, invoicing, inventory control, etc.

40 Claims, 4 Drawing Sheets

VIRTUAL PACKING LIST

FIELD OF THE INVENTION

The present invention relates to a method for using a virtual packing list to facilitate the electronic transfer of digital content deliverables.

BACKGROUND OF THE INVENTION

The Internet is a general purpose, public, global computer network which allows computers hooked into the Internet to communicate and exchange digital data with other computers also on the Internet. Once a computer is coupled to the Internet, a wide variety of options become available. Some of the myriad functions possible over the Internet include sending and receiving electronic mail (e-mail) messages, logging into and participating in live discussions, playing games in real-time, browsing different web sites, as well as downloading and/or uploading files.

Due to the ease, speed, and relatively low cost to exchange files over the Internet, what had traditionally been real articles of manufacture sold at brick and mortar stores are now being sold and delivered as digital content over the Internet. For example, rather than going to the music store at the local mall to purchase a physical CD of a newly released album, the customer can now browse a web site offering a wide collection of music for sale. The customer may click on one or more albums of his or her choice and pay for the purchases by entering a credit card number, all from the convenience of his or her own home. The order and credit card number is secured and sent over the Internet to that particular web site. The order is processed and the files containing the selected albums are compressed and downloaded to the customer's computer, again over the Internet. The compressed music files (e.g., MP3) can be stored in local memory and played back through a music application running on the computer. Alternatively, the customer may burn the file onto a blank CD; the CD may be played back through any traditional CD player.

This type of E-commerce has a wide range of applications. Works of authorship, such as books, calendars, greeting cards, magazines, newspapers, clip art, photographs, etc., can be sold and downloaded off the Internet. Instead of having to drive to a bookseller to buy the latest best seller, a customer may now purchase and download the text directly over the Internet for perusal on his or her computer or some type of hand held display device. With the Internet, software can be bought, sold, and distributed with ease. There would no longer be any problems associated with having to stock shrink wrap software packages at stores. And as broadband services become widely deployed, video files can be downloaded via the Internet. Dedicated video servers can deliver movies on demand to paying viewer audiences. This eliminates the need to drive down to the video store, hope that a copy of the movie is still available at that store, rewinding the VCR tape, and then returning the tape back to the store before a late surcharge is incurred. The potential market and sales associated with E-commerce transactions is huge.

Unfortunately, there are several problems and disadvantages associated with E-commerce transactions. Namely, businesses are accustomed to selling physical tangible goods off-the-shelf at brick and mortar stores. However, E-commerce transactions deal with intangible intellectual property. What are actually being downloaded are strings of binary bits of 0's and 1's. The true value behind the binary strings is its intellectual property (e.g., copyright, trademark, trade secret, or patent). The customer pays for a right-to-use, right-to-copy, right-to-distribute, end-user, etc. license or agreement. Currently, Internet content delivery mechanisms are focused on the reliability, service, and other technical aspects related to E-commerce. The business logic or scheme relating to the value, importance, and meaning of the digital content as an intangible property or asset has largely been ignored.

Thus, there exists a need for a system which provides business meaning to Internet content delivery, especially with respect to the treatment of valuable intellectual property assets of software. It would be preferable if such a system were to be widely adopted, easily disseminated, and easily maintained and modifiable. The need is for sufficient business logic to transport and provide post-transfer treatment of the digital content as an intangible property or asset. The present invention of a virtual packing list meets these above needs.

SUMMARY OF THE INVENTION

The present invention pertains to a virtual packing list for facilitating electronic commerce transactions made over the Internet. When a consumer places an order over the Internet for digital content deliverables, a unique virtual packing list is generated for that order. The virtual packing list contains a manifest of all the digital contents ordered by the consumer. The virtual packing list also optionally includes legal rights, files, and/or other documentation pertaining to the intellectual property corresponding to that commercial transaction. The order is filled based on the virtual packing list. Thereupon, the ordered digital contents, along with the virtual packing list, is downloaded to the consumer. The consumer can verify delivery of the digital contents based on the virtual packing list. Furthermore, the virtual packing list can be used in a host of post-order processes, such as accounting, return receipt, invoicing, inventory control, etc.

In the currently preferred embodiment, a computer system operates in conjunction with an Internet content delivery management service, which uses documents formatted in XML to describe and process those contents as intellectual property assets transferred between entities or organizations. The embodiment of a virtual packing list contains content in Unicode and markup compliant with XML, and also contains Uniform Resource Identifiers to make hypertext references to internal document parts which are directly descriptive of or related to content packaging or external resources, such as to the location of a content package. Content held within virtual packing lists includes a manifest with descriptions and pointers to content packages, related user help or startup files, scripts or application utilities, associated references, feature or defect information, security and integrity data, and is generally extensible for other metadata elements concerning the content delivered.

Optionally, the virtual packing list also contains the commercial, business and/or legal reason and purpose for the Internet delivery, declarations or assertions of rights, withholdings and rights grants, and instructions of use, licensing, routing, or redistribution. This also optionally includes the associated computerized network control systems and methods to generate, validate, store, distribute, present, interpret, and otherwise operate upon documents formatted in this manner for this purpose.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
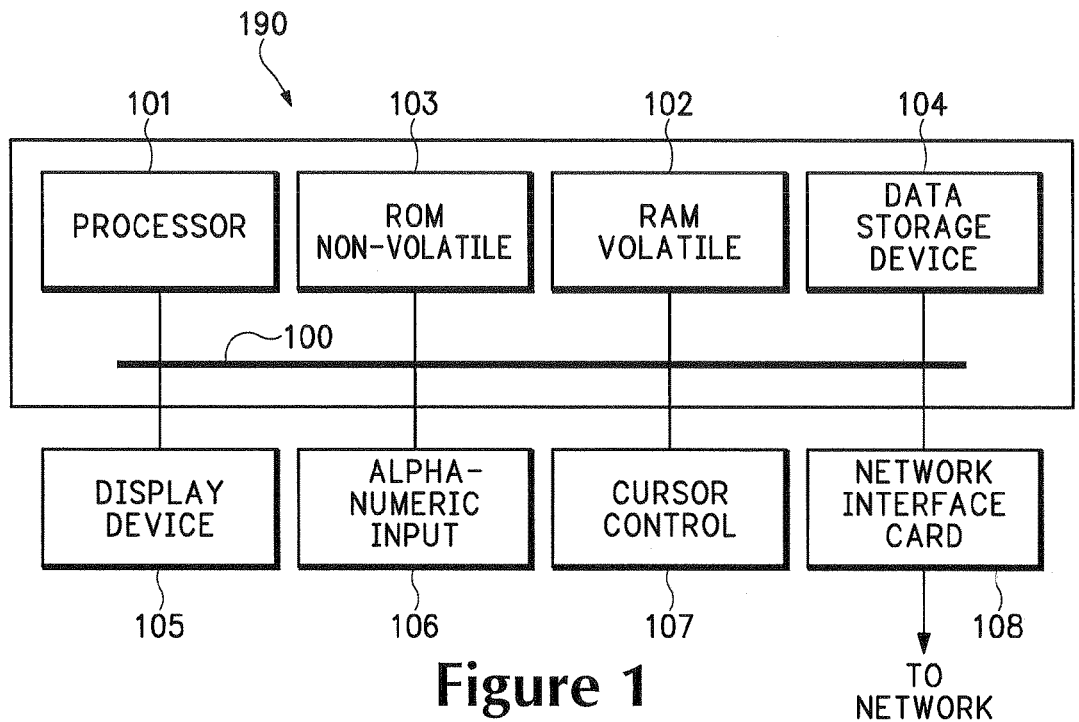
FIG. 1 shows an exemplary computer system upon which embodiments of the present invention may be practiced.

A virtual packing slip is described. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "assigning," "using," "locating," "enabling" "accessing," or the like, refer to actions and processes (e.g., process 400 of FIG. 4) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Referring now to FIG. 1, an exemplary computer system 190 upon which embodiments of the present invention may be practiced is shown. In general, computer system 190 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a client computer system and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
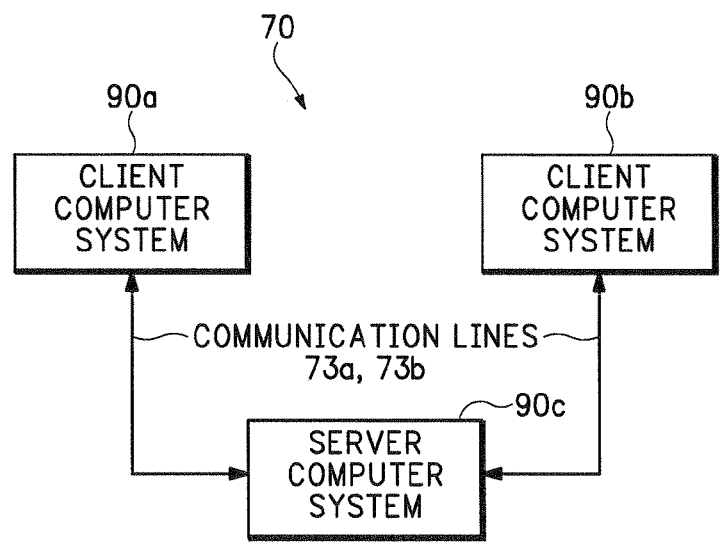
FIG. 2 is a block diagram illustrating an exemplary client-server computer system network upon which embodiments of the present invention may be practiced.
Figure 3:
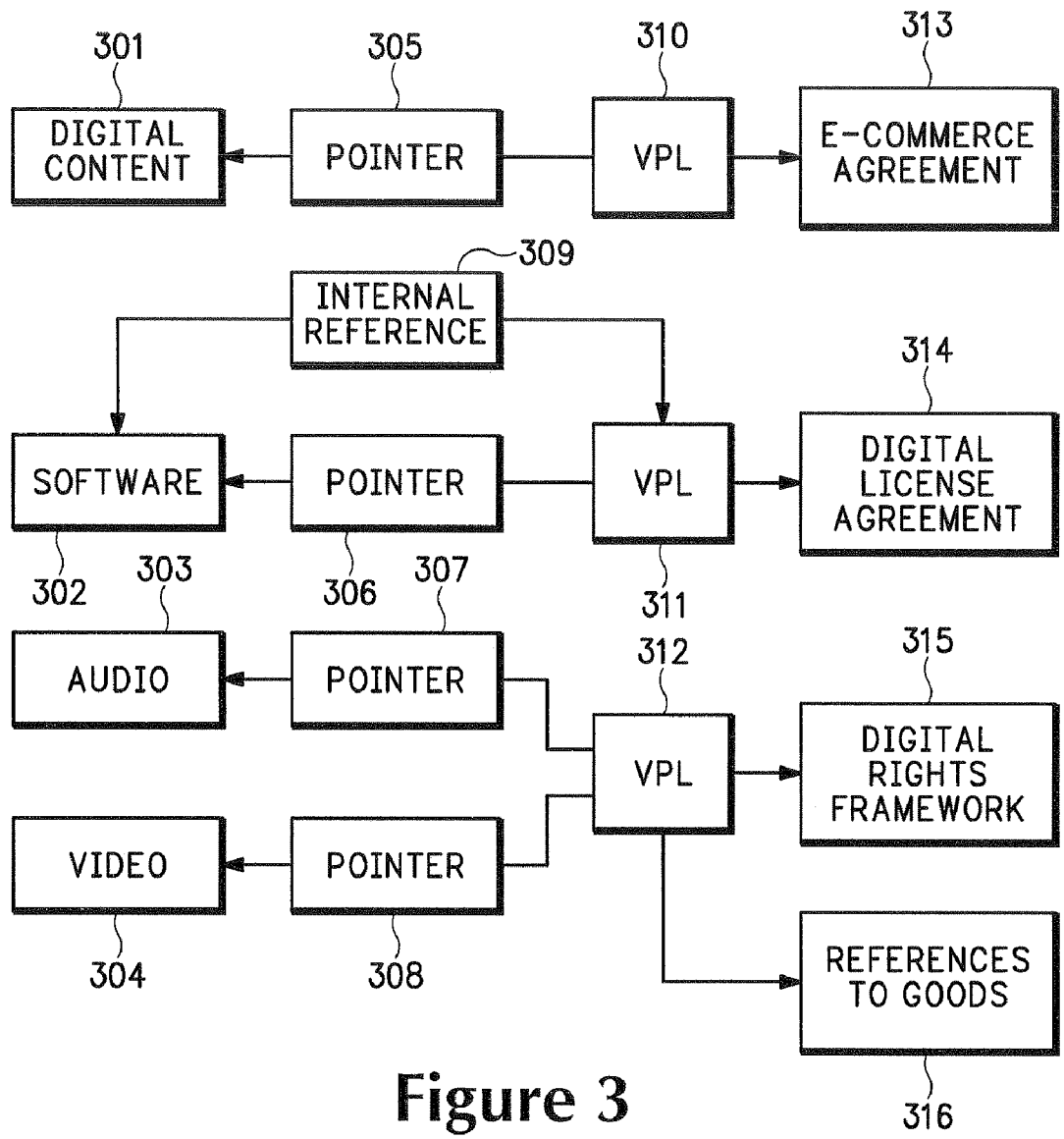
FIG. 3 shows the framework of an intellectual property management system in accordance with one embodiment of the present invention.

FIG. 2 is a block diagram illustrating an exemplary client-server computer system network 70 ("network 70" upon which embodiments of the present invention may be practiced. Network 70 may be a communication network located within a firewall of an organization or corporation (an "Intranet") or network 70 may represent a portion of the World Wide Web or Internet. Client (or user) computer systems 90a and 90b and server computer system 90c are communicatively coupled via communication lines 73a and 73b; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 90a and 90b can be coupled to server computer system 90c via an input/output port (e.g., a serial port) of server computer system 90c; that is, client computer systems FIG. 3 shows the framework of an intellectual property management system in accordance with one embodiment of the present invention. A number of representative intellectual property (IP) instantiations are shown as 301-304. These IP instantiations are represented as digital data files. For example, digital content 301 can be clip art, photographs, newspaper articles, books, a database, or any information stored in a digital data format. Software 302 is another example of an extremely valuable piece of intellectual property. Other forms of IP instantiations include audio 303 (e.g., music, scores, soundtracks, voice, audio clips, talk shows, etc.) and video 304 (e.g., films, video clips, movies, TV broadcasts, pay-per-view events, etc.). Typically, these digital data files are stored on some server coupled to the Internet. Each of the IP instantiations 301-304 has at least one or more associated virtual packing lists (VPL) 310-311.

A virtual packing list is comprised of a relatively small system file that lists or otherwise identifies and describes the deliverables of a commercial transaction. The commercial transaction is made via some electronic delivery means (e.g., typically ordered and delivered over the Internet). These virtual packing lists 310-312 are associated with their corresponding IP instantiations 301-304 by means of tags, pointers, or references 305-308. For example, VPL 310 describes the digital content 301. VPL 310 is associated with digital content 301 by pointer 305. In addition, an optional feature would be to include within an IP instantiation, an internal reference which identifies its corresponding VPL. For instance, a piece of software 302 can have an internal reference 309 (e.g., an address) embedded within the code which points back to its VPL 311. It should be noted that often, a single VPL can point to multiple IP instantiations. For example, VPL 312 can point to an audio instantiation 303 via pointer 307 as well a video instantiation 304 via pointer 308. Suppose that a customer browses the Internet and decides to purchase an album as well as a movie. The selected digital music file and digitized film clip are downloaded from the server site onto the customer site over the Internet. A single VPL 312 describes and defines this particular commercial transaction. The VPL 312 can list both the title of the album and the title of the movie. It can also include other information related to the transaction as well, such as the composer, the director, the file size, the cost, the transaction date, the source site, the destination site, etc.

In addition, an optional feature of the VPL is that it can relate to one or more legal, commercial, or textual documents. Some examples of VPL related documents include an E-commerce agreement 313, a digital license agreement 314, a digital rights framework declaration 315, or some other reference to the goods at issue 316. These documents describe the legal rights associated with that particular electronic transaction (e.g., right to use, right to distribute, right to modify, end user agreement, warranties and indemnifications, technical help, access to web sites, or some other type of legally binding documents). The digital license agreement (DLA) is described in detail in a patent application entitled, "Digital License Agreement," now U.S. Pat. No. 7,031,943, filed concurrently with the present application and which is incorporated herein by its entirety. The digital rights framework (DRF) is described in detail in a paten application entitled, "Digital Rights Framework," now U.S. Pat. No. 6,959,289, filed concurrently with the present application and which is incorporated herein by its entirety.

There are many different ways that a VPL can be used. One of the most important reasons for implementing a VPL system is to uniquely identify a digital transmission over the Internet as being a commercial orderable, sub-orderable, good, or transaction and to distinguish those particular files which represent commercially ordered goods from those which do not. Hence, a VPL can be used before delivery time to understand exactly what it is that is being purchased and what rights the consumer gets for his or her payment. A VPL can be used at the time of delivery to identify the particular goods which were ordered and to corroborate the order. And a VPL can be used post delivery time to inform the customer of the exact contents which had been downloaded, serve notice that delivery has been executed, used for invoicing purposes, and as a backup check for discrepancies or errors in the transaction. Essentially, a VPL serves the same purposes for the electronic transaction of intellectual property over the Internet as that of a pink packing slip physically attached to a package delivery by mail. However, since the VPL is itself a piece of digital code, it can be enhanced, programmed, and used to perform functions otherwise impossible by a mere piece of paper.

It would be beneficial if the VPL were to be implemented in a format that is easily stored, manipulated, forwarded, and understood. In the currently preferred embodiment of the present invention, the VPL is used in a computing system which operates in conjunction with an Internet content delivery management service, which uses documents formatted in an Extensible Markup Language (XML) to describe and process those contents as intellectual property assets transferred between entities or organizations. The XML format contains a structure having references and content to which that particular VPL pertains. XML is a useful meta-language for the embodiment of structured data. It provides structure in an object-oriented methodology for elements, their attributes, data contents, as well as internal and external relationships. It enables the use of standard data types, references and pointers, and encoding mechanisms, such as Unicode. Encoding a VPL in XML allows it to be more easily transported over the Internet or other network systems, facilitates processing via a wide range of computing methods and operating systems, and promotes the adoption and treatment in software applications. Further in the currently preferred embodiment of the present invention, the VPL contains content in Unicode, is markup compliant with XML, and also contains Uniform Resource Identifiers (URI) to make hypertext references to internal document parts which are directly descriptive of or related to content packaging, or external resources, such as to the location of a content package. In addition, the URI can refer to an actual, tangible real world property rather than an Internet deliverable.

In order to support a VPL system, it would be beneficial to incorporate the following implementations: a VPL modeller, a VPL minter, a VPL storage system or directory, a VPL filing system, and a VPL purchasing/accounting system. The VPL modeller is a tool which helps define the ideal or potential of a new VPL. The VPL minter actually generates the VPL according to the dictates of the VPL modeller. The VPL storage system or directory is needed to store the collection of VPLs which have been generated. This can be accomplished by using a database. The VPL storage system would be beneficial to vendors and/or channel partners. The VPL filing system is for use by consumers or users to categorize and file their received VPLs. The VPS purchasing/accounting system accepts VPLs and can perform functions based thereon, such as invoicing, payment of bills, receipt verification, inventory control, finance operations, marketing, etc.

Figure 4:
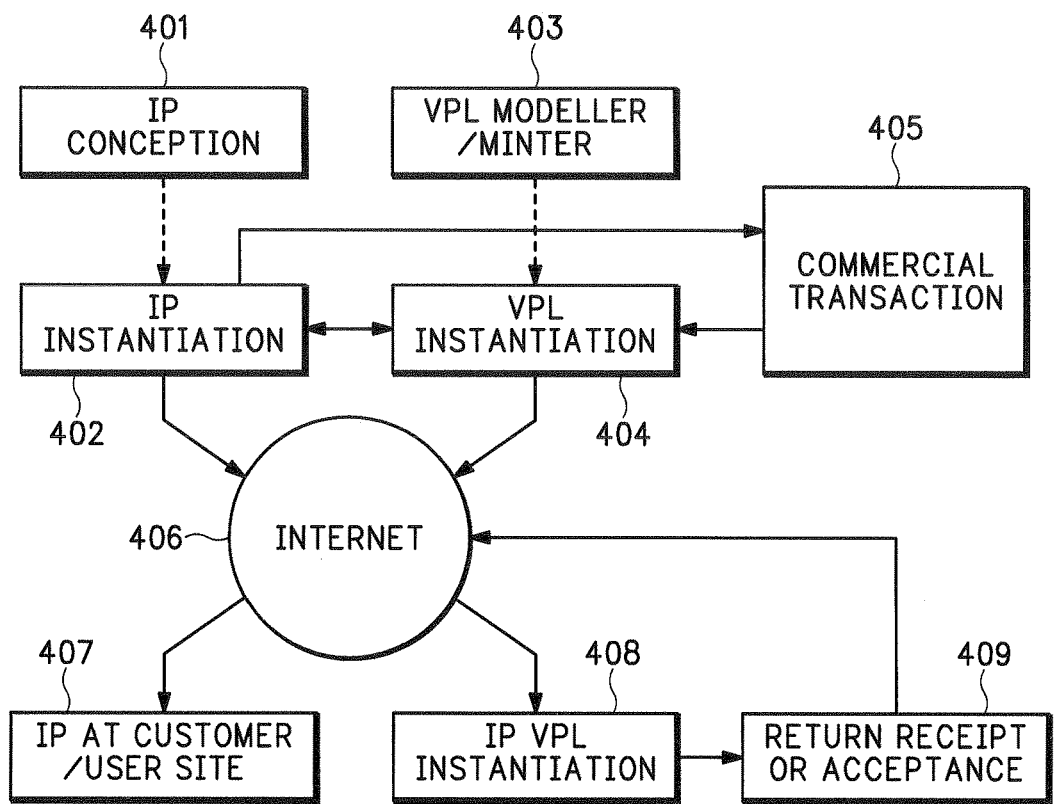
FIG. 4 is a flow diagram of a virtual packing list system.

FIG. 4 is a flow diagram of a VPL system. Initially, an IP conception occurs 401 (e.g., an idea). This IP conception is then embodied by an instantiation 402 (e.g., software). It should be noted that the IP instantiation 402 can optionally refer back to the commercial transaction 405. A commercial transaction between a consumer and a vendor for that IP instantiation is executed 405 (e.g., a vendor offers to sell and a customer offers to buy the software over the Internet). A VPL model 403 instructs a VPL minter to generate a unique VPL instantiation 404 for each commercial transaction 405. The IP instantiation 402 along with its VPL instantiation 404 are downloaded over the Internet 406 to the customer (e.g., the software and its associated VPL are transmitted as IP packets over the Internet to the customer's computer). The IP instantiation is downloaded and stored at the customer/user site 407. Likewise, the corresponding VPL instantiation or a pointer to that VPL instantiation is downloaded and stored on the customer/user site 408. The VPL instantiation can be externalized from the IP content and then used in many different ways. In one embodiment, the VPL is used to perform content based routing. The VPL can identify the end user or consignee. The digital content is then delivered to the Internet address specified in the VPL. For instance, the VPL can be in an e-mail format with the digital content as an attachment. Thereby, the VPL lists the deliverable goods against a purchase order, and the goods are mapped against what was bought. In other embodiments, the VPL can be used as part of an asset management system 410. The VPL instantiation can be stored for subsequent perusal in a filing system 411. The VPL can also be incorporated to trigger some event in an accounting or purchasing system 412. The VPL instantiation can also be used to fulfill a return receipt or acceptance function 409.

Figure 5:
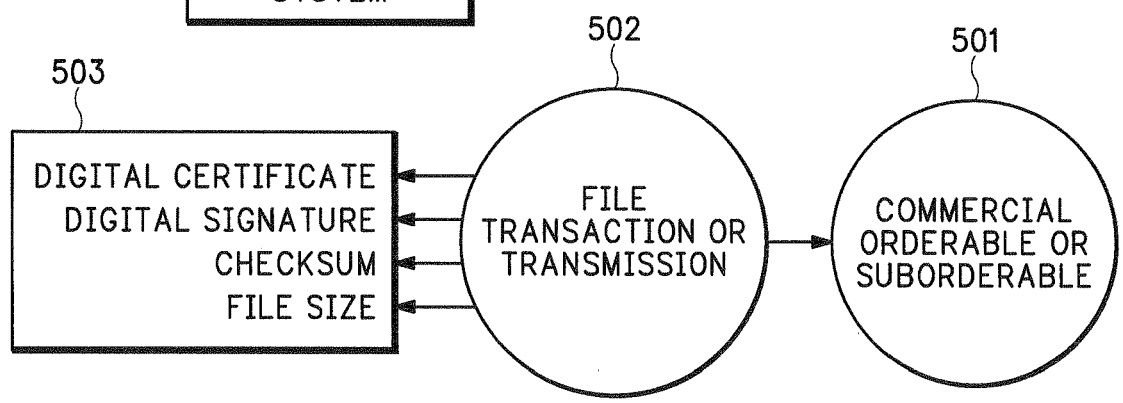
FIG. 5 shows a situation whereby a VPL can act as a return receipt for an electronic transaction.
Figure 6:
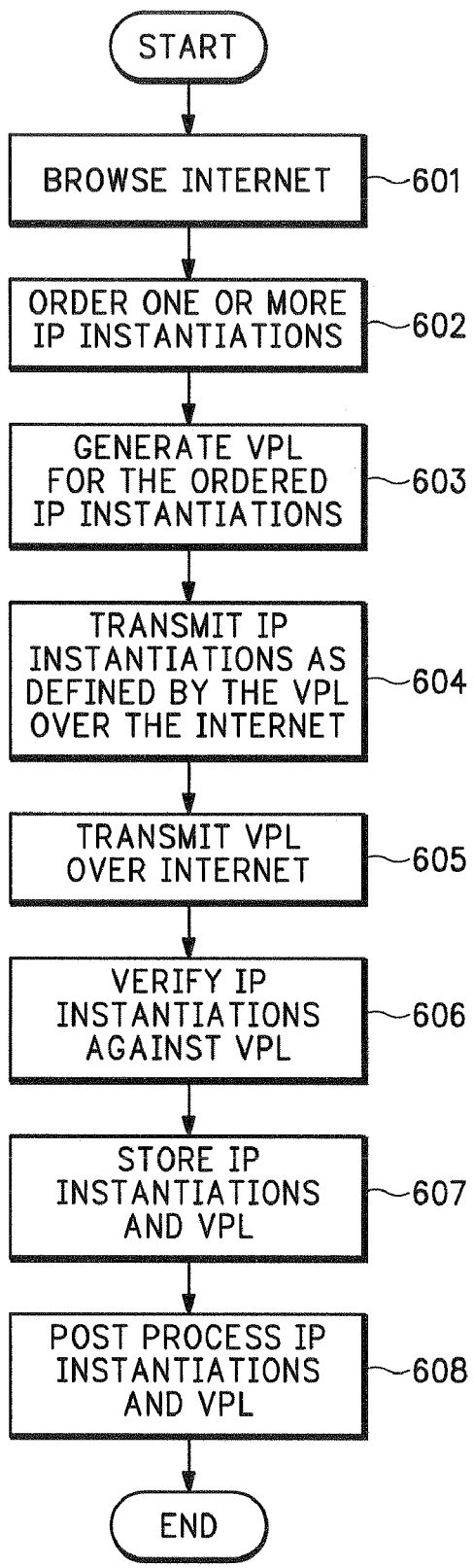
FIG. 6 is a flowchart describing the steps for implementing a VPL system.

FIG. 5 shows a situation whereby a VPL can act as are receipt for an electronic transaction. A commercial orderable or sub-orderable is placed 501. The file transaction or transmission 502 is executed. A VPL is generated and sent along with the digital content corresponding to the file or transmission 503. The consumer or customer may then use the received VPL for purposes of return receipt. This process requires customer review of the VPL 408, matching the items against another system, such as a purchasing/accounting system 412, and then ensuring that the IP was delivered to their site, 407, or to a location conformant to delivery expectations, such as an Application Service Provider (ASP), or other third party Information Technology Partner. Upon acceptance, a return receipt message would be returned to the vendor, referencing the commercial transaction number 405, and/or the VPL number 408. This can also be used by the both parties to certify receipt. For instance, the VPL can list the size of the files or collections of data/content sent and check to ensure that the entire data/content was actually delivered. Digital signatures can be used to verify that the customer acknowledges receipt of the digital content. Likewise, digital certificates (such as X.509 standard certificates) can be used to verify delivery. Alternatively, a checksum or message digest, such as MD5 or SHA, FIG. 6 is a flowchart describing the steps for implementing a VPL system. Initially, a consumer browses the Internet to shop for digital content, step 601. When the consumer finds one or more digital contents that he or she desires, the consumer may place an order by using a cursor to "point-and-click" on the images or icons on the vendor's website which represent the Intellectual Property Instantiations, step 602. For example, a consumer can click on a graphical image of an album representing the music and click on an icon of a book cover representing a best seller for download. In response, the vendor site (e.g., a_store_site_example.com) generates a VPL against the consumer's order, step 603. The IP instantiations (e.g., MP3 file and text file), as defined by the VPL, are then transmitted over the Internet to the customer's address, step 604. In one embodiment, a copy of the VPL or a pointer to the VPL is then transmitted over the Internet to the consumer, step 605. Both the vendor as well as the consumer have access to and can refer to a common VPL. That particular VPL is unique to that particular electronic transaction. Upon receipt of the IP instantiations and the VPL, the consumer may perform a verification that all the ordered goods arrived satisfactorily, step 606. The consumer may also check to verify that the proper legal and/or other documentation meets expectations. If everything is in proper form, the IP instantiations and VPL can be stored, step 607. The IP instantiations can then be post-processed (e.g., redistributed, modified, collated with other IP instantiations, duplicated, etc.), and the VPL can be post-processed (e.g., invoice generation, bill payment, inventory control, etc.), step 608. Steps 601-608 are repeated for each commercial transaction, with a new, unique VPL being created for each new commercial transaction. The VPL contains some unique identifier (e.g., serial number) to match it against a particular commercial transaction.

Therefore, a virtual packing list system for providing an Internet standard to put content packages around the network and treat them as commercial and legal intellectual property assets has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. For instance, in the above description, VPLs are associated with intangible intellectual instantiations. However, it is contemplated within the scope of the present invention that physical real-world objects can also be associated with a VPL as well. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for performing a commercial transaction over the Internet, comprising:

receiving a consumer selected electronic acceptance of terms included in a digital license agreement that defines intellectual property rights for digital content;

approving the digital license agreement including the electronic acceptance of terms;

accepting an order for the digital content from a consumer, where the order is made electronically over the Internet;

generating a virtual packing list which describes the digital content which was ordered over the Internet;

transmitting the digital content over the Internet to the consumer;

transmitting the virtual packing list to the consumer over the Internet, using the virtual packing list transmitted to the customer as a customer return receipt where the virtual packing list transmitted to the customer is matched at a consumer location with the digital content transmitted to the customer;

receiving a return receipt message back from the customer that certifies that the digital content listed in the virtual packing list was successfully transmitted to the customer and matches the digital content transmitted to the customer; and providing a list of file sizes in the virtual packing list transmitted to the customer that identify sizes of the digital content transmitted to the customer; and receiving the return receipt back from the customer proving that the commercial transaction has been successfully transacted when the file sizes identified in the virtual packing list match the sizes of the digital content received by the customer.

2. The method of claim 1 further comprising sending the return receipt back to a vendor or channel partner to prove commercial properties were actually transacted and commercial transaction was successfully completed.

3. The method of claim 1 where the verification of the commercial transaction includes a comparison of the transmitted digital content with the digital content identified in the order.

4. The method of claim 1 further comprising verifying delivery of the digital content against the virtual packing list.

5. The method of claim 1 further comprising performing a security process against the delivered digital content by using data contained in the virtual packing list.

6. The method of claim 5, where the security process comprises a checksum process for comparing a data size of the delivered digital content with a data size of the digital content identified in the order.

7. The method of claim 5, where the security process comprises a hash function for determining if the delivered digital content is corrupt.

8. The method of claim 1, where the virtual packing list contains a pointer to the digital content.

9. The method of claim 1 further comprising generating an invoice associated with the digital content identified in the virtual packing list.

10. The method of claim 1 further comprising performing content based routing according to the virtual packing list that identifies the consumer.

11. The method of claim 1 further comprising listing a plurality of digital content on the virtual packing list, where the plurality of digital content includes different digital content data types.

12. The method of claim 1 further comprising generating a unique virtual packing list for each commercial transaction.

13. The method of claim 1, where the virtual packing list comprises an extensible markup language format.

14. The method of claim 1 where the virtual packing list contains content in Unicode.

15. The method of claim 1, where the virtual packing list contains Uniform Resource Identifiers that point to the digital content.

16. The method of claim 1 where the virtual packing list includes a link to the digital license agreement.

17. A method for performing a commercial transaction over the Internet, comprising:

receiving a consumer selected electronic acceptance of terms included in a digital license agreement that defines intellectual property rights for digital content;

approving the digital license agreement including the electronic acceptance of terms;

accepting an order for the digital content from a consumer, where the order is made electronically over the Internet;

generating a virtual packing list which describes the digital content which was ordered over the Internet;

transmitting the digital content over the Internet to the consumer;

transmitting the virtual packing list to the consumer over the Internet, using the virtual packing list transmitted to the customer as a customer return receipt where the virtual packing list transmitted to the customer is matched at a consumer location with the digital content transmitted to the customer;

receiving a return receipt message back from the customer that certifies that the digital content listed in the virtual packing list was successfully transmitted to the customer and matches the digital content transmitted to the customer;

adding digital signatures in the virtual packing list transmitted to the customer that are associated with the digital content; and receiving the return receipt back from the customer proving that the commercial transaction has been successfully transacted when the digital signatures in the virtual packing list correspond with the digital content transmitted to the customer.

18. A method for performing a commercial transaction over the Internet, comprising:

receiving a consumer selected electronic acceptance of terms included in a digital license agreement that defines intellectual property rights for digital content;

approving the digital license agreement including the electronic acceptance of terms;

accepting an order for the digital content from consumer, where the order is made electronically over the Internet;

generating a virtual packing list which describes the digital content which was ordered over the Internet;

transmitting the digital content over the Internet to the consumer;

transmitting the virtual packing list to the consumer over the Internet, using the virtual packing list transmitted to the customer as a customer return receipt where the virtual packing list transmitted to the customer is matched at a consumer location with the digital content transmitted to the customer;

receiving a return receipt message back from the customer that certifies that the digital content listed in the virtual packing list was successfully transmitted to the customer and matches the digital content transmitted to the customer;

adding a checksum to the virtual packing list transmitted to the customer associated with the digital content; and receiving the return receipt back from the customer proving that the commercial transaction has been successfully transacted when the checksum in the virtual packing list corresponds with the digital content transmitted to the customer.

19. A computer-readable medium having stored thereon instructions for performing a commercial transaction over the Internet, the instructions comprising:

receiving a consumer selected electronic acceptance of terms included in a digital license agreement that defines intellectual property rights for digital content;

approving the digital license agreement including the electronic acceptance of terms;

accepting an order for the digital content from a consumer, where the order is made electronically over the Internet;

generating a virtual packing list which describes the digital content which was ordered over the Internet;

transmitting the digital content over the Internet to the consumer;

transmitting the virtual packing list to the consumer over the Internet, where the virtual packing list enables verification of the commercial transaction including verification of the electronic acceptance of terms;

using the virtual packing list transmitted to the consumer as a consumer return receipt where the virtual packing list transmitted to the consumer is matched at a consumer receiving location with the digital content received by the consumer;

receiving a return receipt message back from the consumer when the digital content listed in the virtual packing list is successfully received by the consumer and matches the digital content received by the consumer;

providing a list of files sizes in the virtual packing list transmitted to the customer that identify sizes of the digital content transmitted to the customer; and receiving the return receipt back from the customer proving that the commercial transaction has been successfully transacted and that the file sizes identified in the virtual packing list match the sizes of the digital content received by the customer.

20. The computer-readable medium of claim 19 where the digital license agreement describes the consumer's legal rights with respect to the digital content.

21. The computer-readable medium of claim 19 further comprising a digital rights framework declaration with the virtual packing list.

22. The computer-readable medium of claim 19 further comprising including a user help file with the virtual packing list including instructions for running a startup file for installation of the digital content.

23. The computer-readable medium of claim 19 further comprising where the verification of the commercial transaction is performed by the consumer or by a consumer's computer.

24. The computer-readable medium of claim 19 where the verification of the commercial transaction includes a comparison of the transmitted digital content with the digital content identified in the order.

25. The computer-readable medium of claim 19 further comprising performing a security process against the delivered digital content by using data contained in the virtual packing list.

26. The computer-readable medium of claim 25, where the security process comprises a checksum process for comparing a data size of the delivered digital content with a data size of the digital content identified in the order.

27. The computer-readable medium of claim 25, where the security process comprises a hash function for determining if the delivered digital content is corrupt.

28. The computer-readable medium of claim 19, where the virtual packing list contains a pointer to the digital content.

29. The computer-readable medium of claim 19 further comprising generating an invoice associated with the digital content identified in the virtual packing list.

30. The computer-readable medium of claim 19 further comprising performing content based routing according to the virtual packing list that identifies the consumer.

31. The computer-readable medium of claim 19 further comprising listing a plurality of digital content on the virtual packing list, where the plurality of digital content includes different digital content data types.

32. The computer-readable medium of claim 19 further comprising generating a unique virtual packing list for each commercial transaction.

33. The computer-readable medium of claim 19, where the virtual packing list comprises an extensible markup language format.

34. The computer-readable medium of claim 19 where the virtual packing list contains content in Unicode.

35. The computer-readable medium of claim 19, where the virtual packing list contains Uniform Resource Identifiers that point to the digital content.

36. The computer-readable medium of claim 19 where the virtual packing list includes a link to the digital license agreement.

37. A system comprising:
a network interface which transmits and receives digital data to and from the Internet;
a port of the network interface which accepts an incoming order made from a remote consumer;
a processor coupled to the port which is configured to:
approve a consumer selected electronic acceptance of terms included in a digital license agreement that defines intellectual property rights for digital content requested in the incoming order,
generate a virtual packing list in response to the incoming order, where the virtual packing list comprises a list of digital content ordered by the remote consumer,
transmit the virtual packing list over the Internet to the remote consumer along with the ordered digital content, and where the virtual packing list enables verification of the commercial transaction including verification of the electronic acceptance of terms, and
create an invoice associated with the ordered digital content and the digital license agreement; and
a memory coupled to the processor which stores the invoice and the associated digital license agreement, wherein the processor uses the virtual packing list transmitted to the remote consumer as a remote consumer return receipt where the virtual packing list transmitted to the remote consumer is matched at a remote consumer location with the digital content received by the remote consumer and the processor receives a return receipt message back from the remote consumer when the digital content listed in the virtual packing list is successfully received by the remote consumer and matches the digital content received by the remote consumer,
wherein the processor is further configured to add digital signatures to the virtual packing list transmitted to the customer that are associated with the digital content so that the return receipt message received back from the remote customer proves that the commercial transaction has been successfully transacted and the digital signatures in the virtual packing correspond with the digital content transmitted to the customer.

38. The computer system of claim 37, where the digital license agreement describes the remote consumer's legal rights with respect to the ordered digital content.

39. The computer system of claim 37, where the verification of the commercial transaction and the generation of the return receipt is performed by the remote consumer or by a consumer's computer.

40. The computer system of claim 37, where the virtual packing list contains pointers to the digital content and to the digital license agreement.

* * * * *